US009672866B2

United States Patent
Sevilla-Lara et al.

(10) Patent No.: US 9,672,866 B2
(45) Date of Patent: Jun. 6, 2017

(54) AUTOMATED LOOPING VIDEO CREATION

(71) Applicant: Adobe Systems Incorporated, San Jose, CA (US)

(72) Inventors: Laura Sevilla-Lara, Tuebingen (DE); Elya Shechtman, Seattle, WA (US); Kalyan K. Sunkavalli, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 8 days.

(21) Appl. No.: 14/811,265

(22) Filed: Jul. 28, 2015

(65) Prior Publication Data

US 2017/0032819 A1   Feb. 2, 2017

(51) Int. Cl.
| | |
|---|---|
| *H04N 5/783* | (2006.01) |
| *G11B 27/00* | (2006.01) |
| *H04N 5/14* | (2006.01) |
| *H04N 9/87* | (2006.01) |
| *G06K 9/34* | (2006.01) |
| *G06K 9/62* | (2006.01) |
| *G06K 9/40* | (2006.01) |

(52) U.S. Cl.
CPC ............ *G11B 27/007* (2013.01); *G06K 9/342* (2013.01); *G06K 9/40* (2013.01); *G06K 9/6215* (2013.01); *H04N 5/145* (2013.01); *H04N 9/87* (2013.01)

(58) Field of Classification Search
CPC .............................. G11B 27/007; G06K 9/342
USPC ........................................................ 386/343
See application file for complete search history.

(56) References Cited

U.S. PATENT DOCUMENTS

| | | | |
|---|---|---|---|
| 6,600,491 B1* | 7/2003 | Szeliski | G06T 13/80 345/421 |
| 2009/0094518 A1* | 4/2009 | Lawther | G06F 3/04817 715/716 |

OTHER PUBLICATIONS

Achanta,"SLIC Superpixels Compared to State-of-the-Art Superpixel Methods", IEEE Transactions on Pattern Analysis and Machine Intelligence, vol. 34, No. 11, Nov. 2012, pp. 2274-2281.
Bai,"A Geodesic Framework for Fast Interactive Image and Video Segmentation and Matting", IEEE 11th International Conference on Computer Vision, Oct. 2007, 8 pages.
Boykov,"An Experimental Comparison of Min-Cut/Max-Flow Algorithms for Energy Minimization in Vision", IEEE Transactions on Pattern Analysis and Machine Intelligence, vol. 26, No. 9, Sep. 2004, pp. 1124-1137.

(Continued)

*Primary Examiner* — Hung Dang
*Assistant Examiner* — Girumsew Wendmagegn
(74) *Attorney, Agent, or Firm* — Wolfe-SBMC

(57) ABSTRACT

Automated looping video creation techniques are described. In one or more implementations, a digital medium environment is configured to create a looping video that supports repeated playback that appears generally seamless to a user by one or more computing devices. Frames of a video are segmented into foreground and background regions by the one or more computing devices. Similarity of the foreground regions is determined of the segmented frames, one to another, by the one or more computing devices to use as a transition in the looping video. The looping video is synthesized as a subset of the video by the one or more computing devices as having the transition based on the determined similarity of first and second said frames.

20 Claims, 11 Drawing Sheets

(56) References Cited

OTHER PUBLICATIONS

Fu,"Geodesic saliency propagation for image salient region detection", 20th IEEE International Conference on In Image Processing (ICIP), Sep. 2003, pp. 3278-3282.
Krahenbuhl,"Geodesic Object Proposals", In European Conference on Computer Vision, 2014, 15 pages.
Price,"Geodesic Graph Cut for Interactive Image Segmentation", IEEE, ICCV, 2010, 8 pages.
Wei,"Geodesic Saliency Using Background Priors", In Computer Vision—ECCV 2012, Oct. 7, 2012, 14 pages.
Agarwala,"Panoramic Video Textures", ACM Transactions on Graphics (Proc. SIGGRAPH), Jul. 2005, 9 pages.
Arev,"Automatic Editing of Footage from Multiple Social Cameras", ACM Transactions on Graphics (Proc. SIGGRAPH), Jul. 2014, 11 pages.
Bai,"Selectively De-Animating Video", ACM Transactions on Graphics (Proc. SIGGRAPH), Jul. 2012, 10 pages.
Bai,"Video SnapCut: Robust Video Object Cutout Using Localized Classifiers", ACM SIGGRAPH 2009 papers Article No. 70, Jul. 2009, 11 pages.
Ballan,"Unstructured Video-Based Rendering: Interactive Exploration of Casually Captured Videos", ACM Transactions on Graphics (Proc. SIGGRAPH), Jul. 2010, 10 pages.
Berthouzoz,"Tools for Placing Cuts and Transitions in Interview Video", ACM Trans. Graph., Jul. 2012, 8 pages.
Doretto,"Dynamic Textures", International Journal of Computer Vision, 2003, 19 pages.
Freeman,"Metamers of the ventral stream", Nature neuroscience, 14(9):1195-1201, 2011., 2011, 24 pages.
Goldman,"A Framework for Video Annotation, Visualization, and Interaction", PhD thesis, University of Washington, 2007., 2007, 136 pages.
Gomes,"Warping and Morphing of Graphical Objects", SIGGRAPH 1997, 1997, 177 pages.
HaCohen,"Non-Rigid Dense Correspondence with Applications for Image Enhancement", SIGGRAPH, 2011, 9 pages.
Joshi,"Cliplets: Juxtaposing Still and Dynamic Imagery", In Proceedings of the 25th Annual ACM Symposium on User Interface Software and Technology, 2012, 11 pages.
Kemelmacher-Shlizerman,"Exploring Photobios", ACM Transactions on Graphics (Proc. SIGGRAPH) Jul. 2011, 9 pages.
Kwatra,"Graphcut Textures: Image and Video Synthesis Using Graph Cuts", ACM Trans. Graph. 22 (2003), 3, 2003, 10 pages.
Levieux,"Interactive Viewpoint Video Textures", In Visual Media Production (CVMP), 2012 Conference, Dec. 2012, 7 pages.
Liao,"Semi-Automated Video Morphing", Computer Graphics Forum—Proceedings of Eurographics Symposium on Rendering 2014, 2014, 10 pages.
Liao,"Automated Video Looping with Progressive Dynamism", ACM Transactions on Graphics (Proc. SIGGRAPH), Jul. 2013, 10 pages.
Papazoglou,"Fast object segmentation in unconstrained video", ICCV, 2013., 8 pages.
Regg,"DuctTake: Spatiotemporal Video Compositing", Computer Graphics Forum, 2013, 11 pages.
Rother,"GrabCut—Interactive Foreground Extraction using Iterated Graph Cuts", In ACM Transactions on Graphics (Proc. SIGGRAPH), 2001, 6 pages.
Schodl,"Video Textures", In ACM Transactions on Graphics (Proc. SIGGRAPH), 2000, 10 pages.
Shechtman,"Regenerative Morphing", CVPR, 2010, 8 pages.
Sun,"Secrets of Optical Flow Estimation and Their Principles", IEEE Int. Conf. on Computer Vision and Pattern Recognition, 2010., 2010.
Tompkin,"Towards Moment Imagery: Automatic Cinemagraphs", In Visual Media Production (CVMP), Nov. 2011, 7 pages.
Zheng,"Parallax Photography: Creating 3D Cinematic Effects from Stills", In Graphics Interface 2009, 2009, 8 pages.

* cited by examiner

AUTOMATED LOOPING VIDEO CREATION

BACKGROUND

Looping videos typically include a sequence of frames that is repeated, such as to give an appearance of continuous motion. For example, a looping video may be played back by repeating frames of a user dribbling a basketball to give an appearance that the user dribbles the basketball in perpetuity. Looping videos, including animated GIFs, have gained tremendous popularity recently with the ease of video capture and the introduction of video sharing services. For example, more than one hundred million people watch videos on one such service, with over one billion videos played daily. The typical length of these videos may be short, such as from six to fifteen seconds and are popular on social networks, blogs, digital marketing, music clips and art because of this length.

Looping videos are typically used to capture key scene dynamics and can convey a richer meaning than a single photograph, but are more concise, portable, and sharable than long videos. Additionally, looping videos support efficient viewing because the user is presented with a repeated sequence and thus can automatically review the key scene dynamics again, e.g., to see something the user missed or "didn't quite catch" the first time viewing the video.

Conventionally, looping videos are created by cutting a short clip from a longer video. This frequently leads to abrupt changes from the last to the first frame and thus results in an uncomfortable experience when watching the frames played as a repeating loop. One popular technique that is used to mitigate the abruptness of this change is to play the video back-and-forth by concatenating a copy of the video in reverse order. While this alleviates abruptness due to change in location, the change in motion is still abrupt, and it often creates unrealistic motions due to time-reversal.

In contrast, artists, animators and professional photographers may manually create striking looping videos by perfectly "closing the loop" to form a seamless transition from the last frame back to the first frame. However, conventional techniques used to create the looping videos from casual video footage can be highly tedious or even impossible for some videos. Conventional techniques typically require a user to manually find the right cut locations in the video and align the two ends using professional video editing tools. Thus, these conventional manual techniques can be time consuming and require specialized knowledge of the user, which limits the usefulness and prevalence of the looping videos. Further, motion of objects within a frame may further complicate even manual techniques to create a looping video, which may make even conventional manual techniques ill-suited to create a looping video from a video that includes motion.

SUMMARY

Automated looping video creation techniques are described. In one or more implementations, a digital medium environment is configured to create a looping video that supports repeated playback that appears generally seamless to a user by one or more computing devices. Frames of a video are segmented into foreground and background regions by the one or more computing devices. Similarity of the foreground regions is determined of the segmented frames, one to another, by the one or more computing devices to use as a transition in the looping video. The looping video is synthesized as a subset of the video by the one or more computing devices as having the transition based on the determined similarity of first and second said frames.

In another example, a digital medium environment has a system configured to create a looping video that supports repeated playback that appears generally seamless to a user. The system includes a similarity module implemented at least partially in hardware to determine similarity of foreground regions of frames of a video, one to another, automatically and without user intervention to use as a transition in the looping video. The similarity is based on appearance of the foreground regions and motion exhibited by the foreground regions. The system also includes a video synthesis module implemented at least partially in hardware and configured to synthesize the looping video by the one or more computing devices having the transition based on the determined similarity of first and second said frames.

In additional example implementations, a digital medium environment is configured to create a looping video that supports repeated playback that appears generally seamless to a user by one or more computing devices. Frames of a video are segmented into foreground and background regions by the one or more computing devices. Similarity of the foreground regions is determined of the segmented frames, one to another, by the one or more computing devices to use as a transition in the looping video. The looping video is synthesized by the one or more computing devices having the transition based on the determined similarity of first and second frames. The synthesis includes morphing at least one of the foreground regions of the first or second said frames to increase similarity, one to another, separately from morphing of at least one of the background regions of the first and second said frames to increase similarity, one to another.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
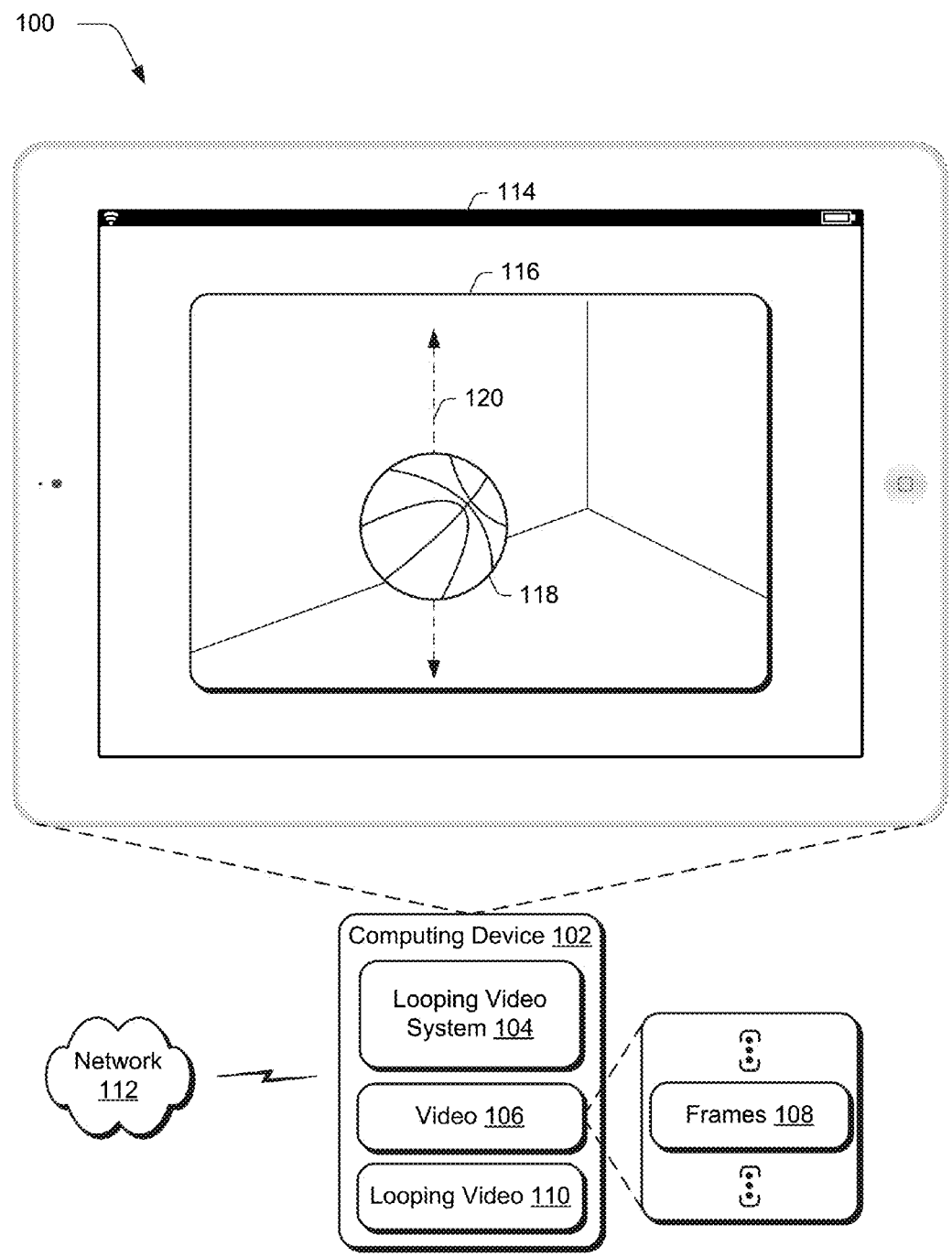
FIG. 1 is an illustration of an environment in an example implementation that is operable to employ automated looping video creation techniques described herein.

Conversion of videos having unconstrained video sequences into looping videos that appear to repeat seamlessly is a challenging task to perform, even manually. Although conventional techniques have been developed to create looping videos, these techniques often fail for videos that included objects that exhibit movement, require specialized knowledge to be manually performed, and often result in abrupt transitions that appear jarring to a user.

Automated looping video creation techniques are described. In the following, the techniques are usable to create a looping video automatically and without user intervention that has a transition that appears seamless to a user. Further, the techniques described herein may be used to handle videos "in the wild". These types of videos are typically captured by hand-held devices and contain arbitrary camera motion (including translation and zoom) and complex, non-rigid scene dynamics, such as human motion. Thus, the techniques described herein are usable over a wider range of videos typically captured by users as opposed to conventional techniques that did not address motion.

In order to do so, frames of a video are segmented into foreground regions and background regions. Similarity of the foreground regions is then analyzed to locate frames that are to serve as a transition in the looping video. This leverages an insight that users have a higher tolerance to inaccuracies to a periphery of a primary point of attention in a frame as opposed to the primary point of attention itself. Accordingly, by determining similarity based on foreground regions a likelihood is increased that the corresponding frames will appear to transition seamlessly to a user. Similarity is definable in a variety of ways, such as based on appearance of the foregrounds regions as well as similarity of motion exhibited by the foreground regions, e.g., using Non-Rigid Dense Correspondences as further described below.

Once a transition is identified, the looping video is synthesized. This may include use of morphing techniques to increase the similarity of the frames that are to be used in the transition, one to another. Additionally, the morphing techniques may also take advantage of the segmentation of the frames into foreground and background regions. A foreground region, for instance, may be synthesized using a morphing technique that is different than a morphing techniques used for the background regions. Synthesis may also leverage use of patch-based techniques, linear motion constraints for the background region, second-order motion constraints for the foreground and automatic temporal gap estimation based on the dynamics of the scene and so on as further described in the following.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ automated looping video creation techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 11.

Figure 8:
FIG. 8 depicts an example comparison of results of texture morphing, conventional morphing, and morphing using the techniques described herein.

The computing device 102 is illustrated as including a looping video system 104 that is representative of functionality implemented at least partially in hardware as further described in relation to FIG. 8 to process a video 106 having a plurality of frames 108 to generate a looping video 110. Although the looping video system 104 is illustrated as implemented locally on the computing device 102, functionality represented by the looping video system 104 may also be implemented as split between the computing device 102 and functionality (e.g., a web service) accessible via the network 112, implemented solely via the web service, and so on.

Looping video 110, as previously described, is configured in these examples to support a seamless transition to a viewer of the video. For example, a user that begins watching a looping video at some point other than a beginning of the video may not be able to determine at which point the output began, but rather is presented with a continuous motion. As illustrated on a display device 114 of the computing device 102, for instance, a looping video 116 is shown that includes a foreground object of a basketball 118 bouncing 120 that is depicted through use of a phantom line. Through repetition of output of the looping video 110, the ball 118 may appear to bounce 120 for as long as the video is played without a user being aware or have limited awareness of transitions between subsequent repetitions. Accordingly, the looping video system 104 is configured to employ segmentation and morphing to create these transitions automatically and without user intervention, further discussion of which is described in the following.

Figure 2:
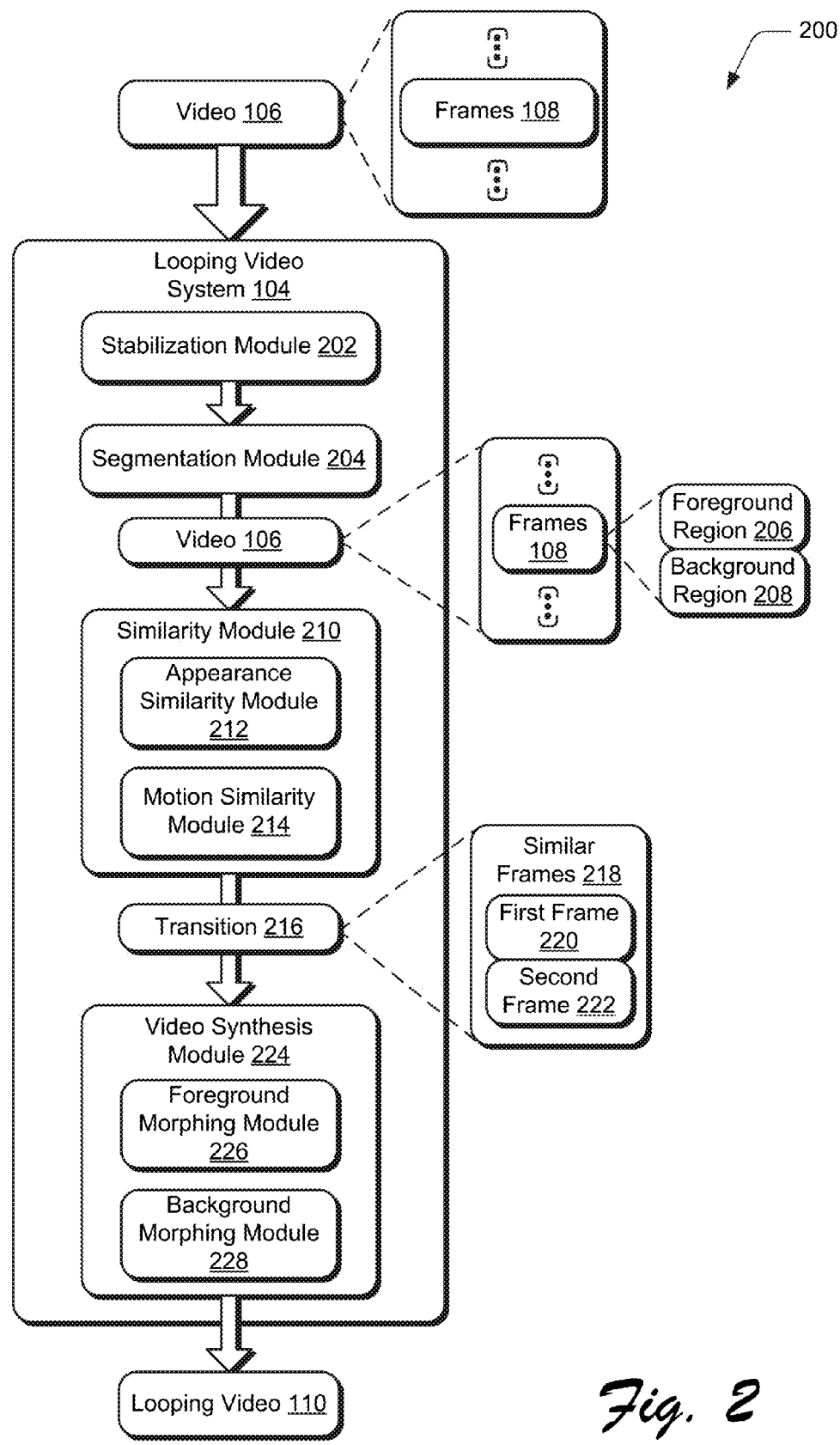
FIG. 2 depicts a system in an example implementation showing a looping video system of FIG. 1 in greater detail.

FIG. 2 depicts a system 200 in an example implementation showing the looping video system 104 of FIG. 1 in greater detail. The looping video system 104 begins by receiving a video 106 "V" having a plurality of frames 108 and uses a subset of those frames to produce a looping video 110 "$V_{out}$" having a last frame seamlessly transitions to the first frame, i.e., back to the beginning of a sequence of the frames 108 in the video 106. This may be used to produce a realistic and compelling looping video 110 in which differences between the foreground and background appearance (illumination, location, pose) or scene dynamics (velocities and higher location derivatives) between these frames smoothly change so that a user's ability to detect the transition is reduced.

Generally, this is performed in the following using a two-step process. In the first step, an analysis stage, the video 106 is analyzed to automatically choose a subset of the frames 108 that has a greatest relative likelihood of producing a smooth transition of a foreground region (e.g., primary subject matter) of the frames 108. This is performed by finding frames in the video 106 that have the most similar foreground regions, up to a global rigid alignment, which results in a frame pair (a, b) that denotes a start and end of the subset of frames 108 (e.g., a "clip") that are used to synthesize the looping video 110.

Although the appearance of the foreground regions in these frames may be similar, the looping video system 108 may employ techniques to increase similarity and thus alignment such that the looping video 110 includes a seamless transition. Accordingly, in the second step (i.e., the synthesis stage) frames that are part of and/or sequentially close to the transition, i.e., frames V(a+k) to V(a) and V(b) to V(b−k), are morphed to handle the differences in appearance and motion. In this way, a smooth transition is synthesized of both the foreground and the background regions from frame "b" back to frame "a" to generate the looping video 110 "$V_{out}$."

As previously described, the looping video system 104 is able to address casual videos that oftentimes contain high frequency camera motion due to unintended camera jitter, which may make it difficult to make assumptions about foreground motion. As part of this, the looping video system 104 may first use a stabilization module 202 that is representative of functionality to remove a high frequency component of camera motion from the frames 108 of the video 106. An example of this is a warp stabilization tool set. Conventional techniques, on the other hand, are not configured to handle camera motion and thus are forced to stabilize an input video to eliminate background motion entirely. The looping video system 104 described herein, however, is configured to address low-frequency camera and foreground motions. Therefore, the video 106 processed by the stabilization module 202 removes the high frequency components of the camera motion, solely, to leave other motion components. In this way, casual videos may be used and further a looping video 110 may be generated that includes camera and foreground motions and thus may appear more natural to a user, which is not possible using conventional techniques.

The video 106 processed by the stabilization module 202 is then passed to a segmentation module 204. The segmentation module 204 is representative of functionality to segment frames 108 of the video into a foreground region 206 and a background region 208. A variety of techniques can be used to perform this segmentation. For example, a motion segmentation algorithm may be used that is automatic and designed to employ few assumptions regarding the input video 106, e.g., lack of motion. This technique involves calculation of an initial estimate based on motion boundaries followed by refinement based on a spatial and temporal considerations to produce per-frame 108 masks that define foreground and background regions 206, 208.

In some instances, the per-frame masks computed by this technique may contain several non-connected components and thus may miss some portions of the foreground region. Accordingly, techniques may be used to smooth the mask with a median filter, fill in holes by dilating the mask, and then choose the main connected component as the foreground.

Figure 3:
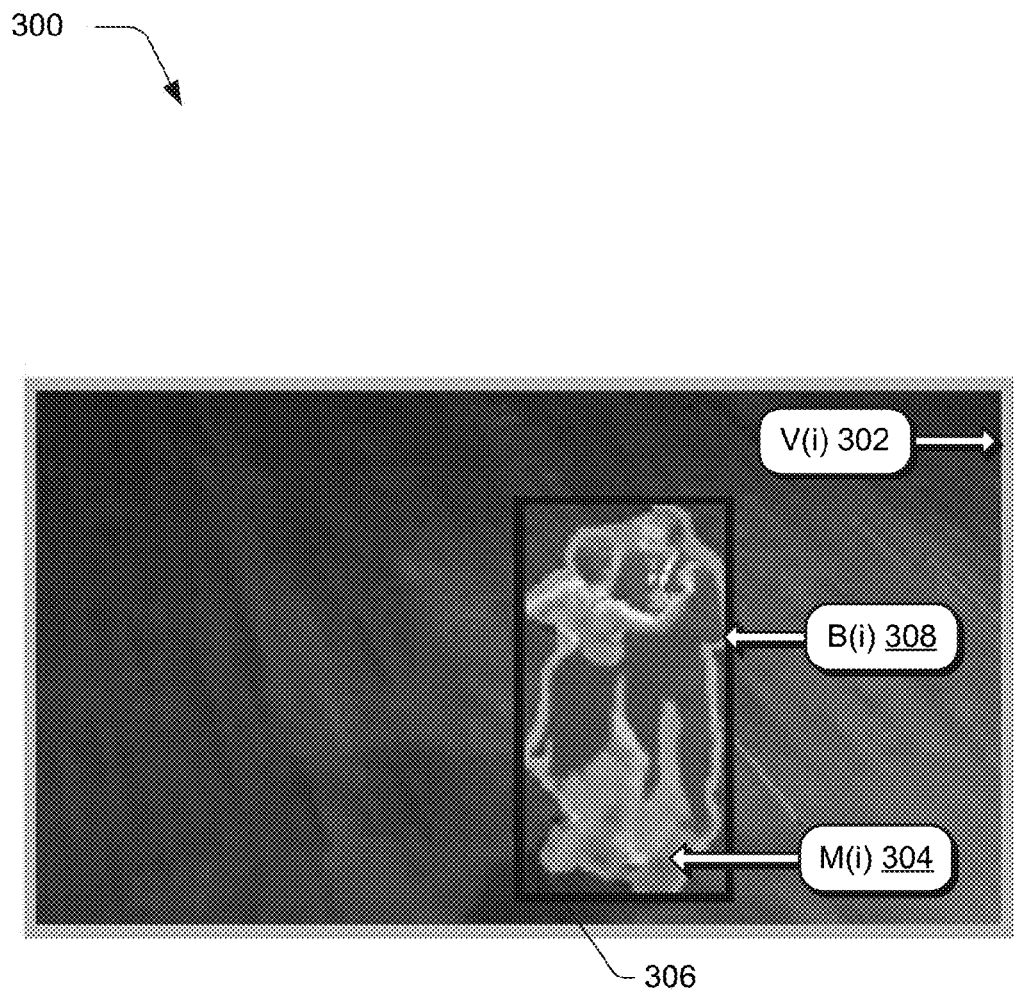
FIG. 3 depicts an example implementation of a binary mask obtained as a result of segmentation.

As shown in an example implementation 300 in FIG. 3, for each frame V(i) 302, a binary mask obtained as a result of the segmentation is denoted as M(i) 304. For future computation of motion similarity, a bounding box 306 is constructed around the binary mask, and this bounded portion of the image is referred to as B(i) 308 in the following.

The segmented frames of the video 106 are then passed to a similarity module 210 that is representative of functionality to detect similarity of frames 108, a basis of which is used to pick a pair of frames (a, b) that are to be used as a transition point. As previously described, the choice of transition point plays a key role in the quality of the output of the looping video 110. To create the most natural looking video loops, a pair of frames is selected by the similarity module 210 in which respective foreground regions 206 are the most similar. Similarity is definable in a variety of ways. For example, an appearance similarity module 212 may be used to determine similarity of based on appearance, e.g., color, texture, and so forth for pixels within the foreground. In another example, a motion similarity module 214 is used to determinate similarity based on motion exhibited within the frames 108. Thus, in this example, similarity of the frames 108, one to another, may be determined by both appearance in motion.

For example, a pair of the frames 108 may be chosen by maximizing the following expression:

$$(a, b) = \underset{(i,j)}{\mathrm{argmax}} S_{app}(i, j) + S_{motion}(i, j)$$

where the terms "$S_{app}$" and "$S_{motion}$" refer to the similarity in appearance and motion, respectively, and are computed on the bounding box of the foreground in each frame, B(i) 308 as shown in FIG. 3.

The appearance similarity module 212 may employ a number of different metrics to assess the similarity of the foreground regions 206 of two frames. Given the segmentation computed previously, pixel-wise metrics may be used such as a sum of squared differences (SSD) of color values that is restricted to the bounding boxes. However, pixel-wise metrics may be sensitive to transformations and deformations. As such, a small inaccuracy of the segmentation mask may lead to a shift in the bounding box, and thus a low similarity score, even if the foreground appearance is very similar. Even if the bounding boxes are well aligned, non-rigid deformations of the foreground (due to motion) may lead to low similarity scores.

In one or more implementations, correspondences between the foreground regions 206 of two frames 108 are found and used as a proxy for appearance similarity. This is based on the observation that the more similar the foreground regions 206, the more correspondences are likely to be found between the frames 108 and thus the more similar these correspondences are likely to be. A variety of techniques are usable to find correspondences, such as a Non-Rigid Dense Correspondence (NRDC). NRDC is robust to changes in illumination, is designed for pairs of images where only part of the content is shared and unmatched regions do not hurt the estimation of the correspondence, and provides a confidence map that indicates which pixels have a correspondence.

Given two bounding boxes "B(i)" and "B(j)," for instance, an NRDC is computed and a confidence map obtained that indicates whether a pixel in "B(i)" has found a correspondence in "B(j)." Similarity may then be expressed as a ratio of foreground pixels that are shared between the bounding boxes. In other words, the proportion of the number of pixels with valid correspondences to the total number of pixels in the foreground is used, which is computed as follows:

$$S_{pair}(i, j) = \frac{\sum_x \gamma(B(x, i), B(x, j)) \odot M(x, i)}{\sum_x M(x, i)}$$

where the function "γ(·)" returns the correspondence confidence from the NRDC algorithm (e.g., "0" indicates that there is no confident match and "1" indicates there is absolute certainty about the match), "⊙" is the element-wise product and "M(x,i)" is pixel "x" of mask "M(i)." In one or more implementations, bounding boxes are scaled to a set resolution (e.g., 200×200) for this similarity measure.

Figure 4:
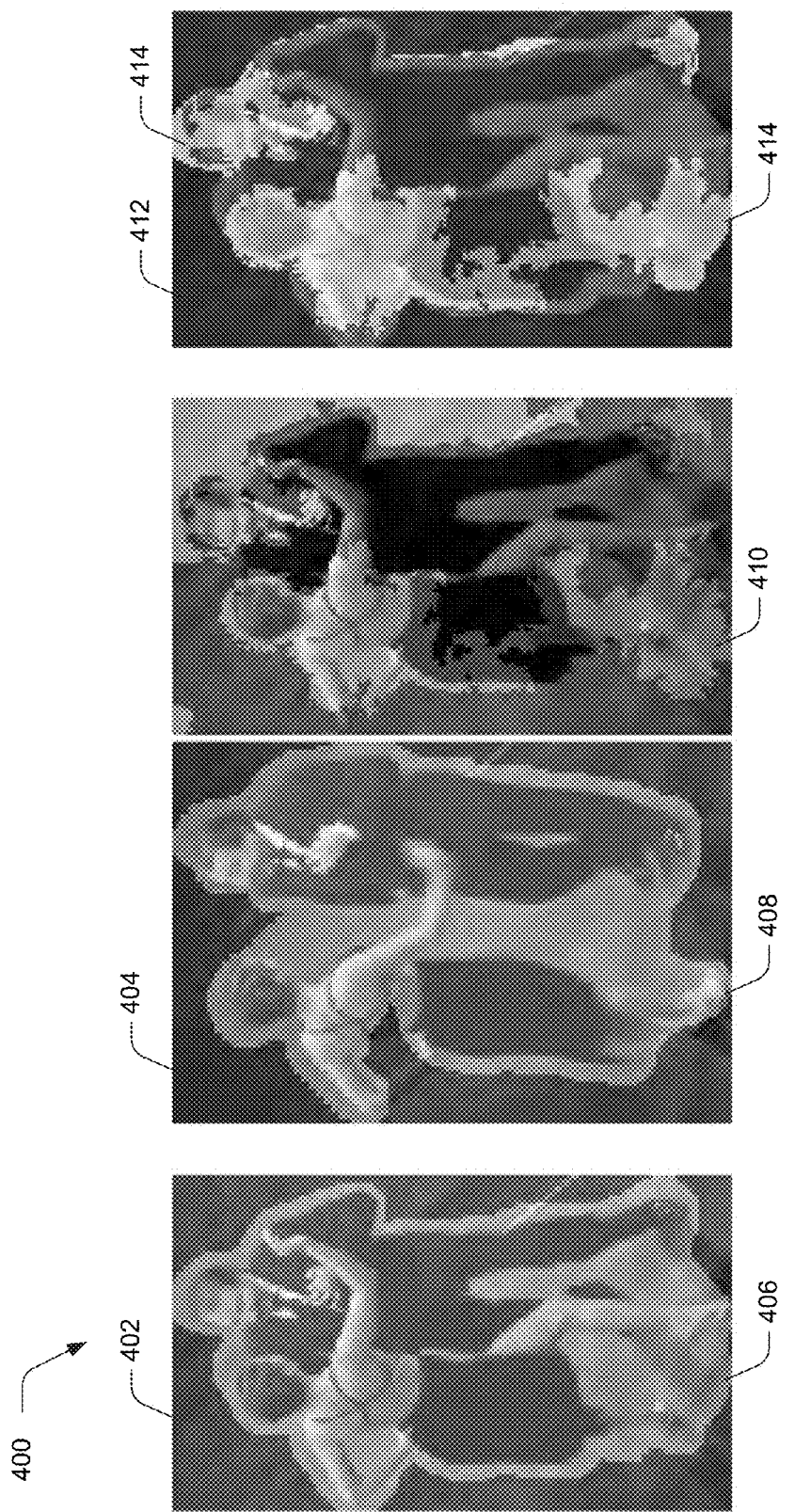
FIG. 4 depicts an example implementation of use of a similarity metric.

FIG. 4 depicts an example implementation 400 of use of a similarity metric. A pair of bounding boxes 402, 404 are illustrated as having corresponding foreground regions 406, 408 illustrated using light gray that are used as an input to compute correspondences using NRDC. A confidence mask 410 is also illustrated that is computed using NRDC, which is also illustrated in light gray. A result 412 of overlapping the foreground mask and confidence mask. In this example, pixels 414 contained in both masks (colored in bright gray in the illustration) are used to compute the similarity, solely.

To increase robustness and temporal coherence, the similarity module 210 may select a transition 216 having similar frames 218, e.g., first and second frames 220, 220 that are included as part of a sequence of frames having high similarity, one to another. For example, similarity may be captured across a range of frames by summing the similarity over a temporal window around a considered transition as follows:

$$S_{app}(i, j) = \sum_{-l \leq k \leq l} w(k) S_{pair}(B(i+k), B(j+k))$$

where "$\omega_k$" is a Gaussian weight with a standard deviation of 1, and "|l|" is the size of the neighborhood, e.g., "|l|=5."

For similarity in motion, NRDC is usable to find good non-rigid correspondences, and thus the previous term ensures similar appearance within the segmented foreground across a set of frames. This may be sufficient to ensure temporal smoothness for relatively static foregrounds with simple motions. However, "$S_{app}$" only ensures good similarity exists across several frames, and does not take into account global motion of the objects relative to corresponding backgrounds, as often happens in casual use video cases as previously described. For example, in a repetitive motion like a child jumping on a trampoline, a series of frames where the child is going upward may be matched to a series of frames where the child is going downward, because the correspondences subsume the differences in the motion between these two scenarios. However, a combination of these clips leads to a non-realistic change in the global motion.

To avoid this problem, another term may be added to the objective function that captures the relative rigid motion of the foreground object with respect to the background. For example, the bounding boxes for one video may be transformed to follow relative motion of the other video with the similarity then recomputed using the new bounding boxes. For a pair of frames "V(i), V(j)" this is performed by computing a transformation "T̂" that best aligns the foreground in "V(i)" to the one in "V(j)." This transformation is parameterized using translation and scale such that more degrees of freedom lead to a less robust estimation and such transformations are typically less common within the same video. The transformation "T̂" aligns the video frames "V(i)" and "V(j)." The location of the bounding boxes "B" is then transformed at a few frames before and after "j," i.e., "B(j±k)," to compute the transformed bounding boxes, "B'(j±k)."

If the global motion of the foreground is similar in both videos, then the original bounding boxes "B(j±k)" and the transformed ones "B'(j±k)" will be similar, and therefore, "B'(j±k)" will overlap largely with the foreground. However, if the motion in both clips is not similar, then "B'(j±k)" will mostly contain background pixels.

Figure 5:
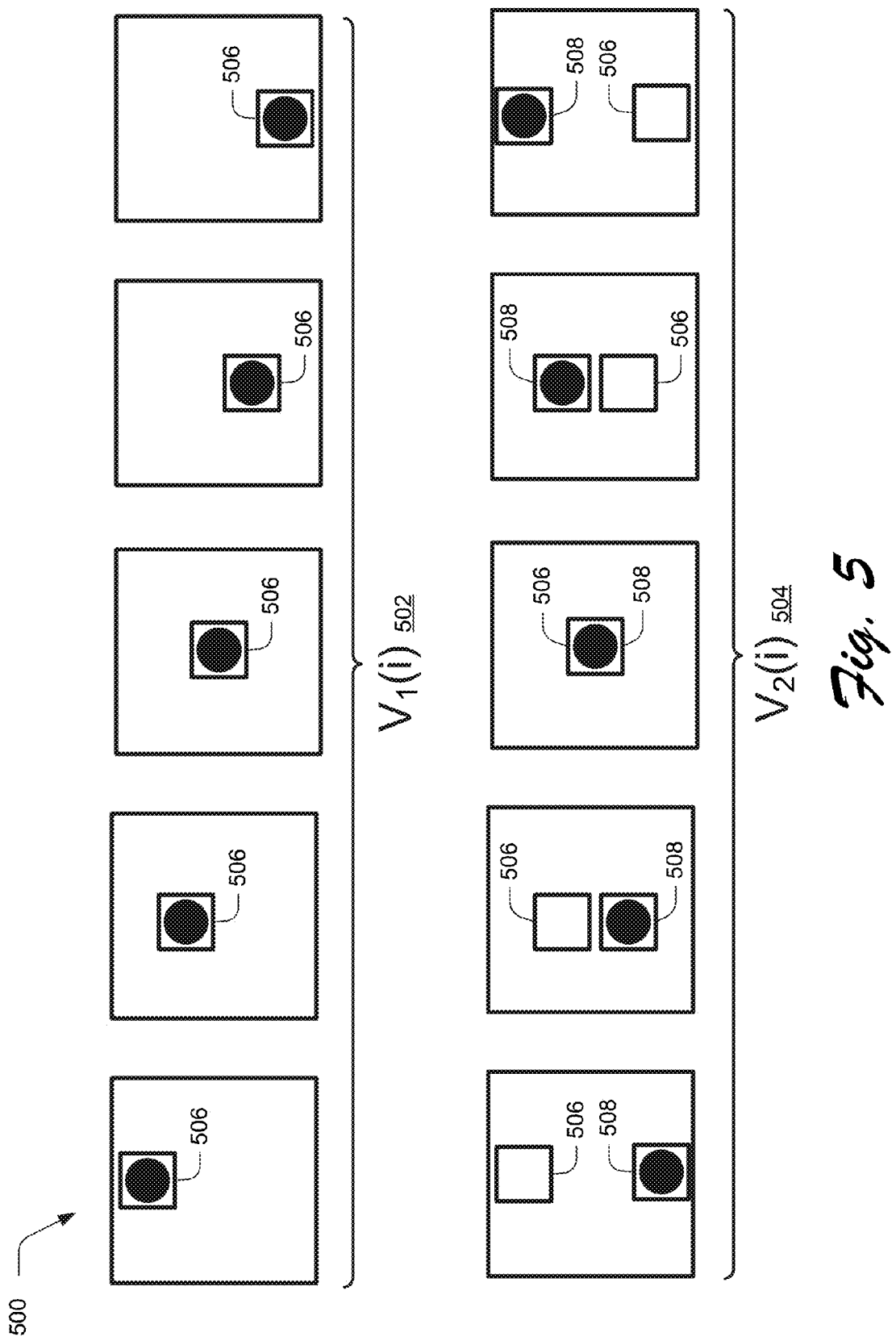
FIG. 5 depicts an example implementation of a transformation process.

FIG. 5 depicts an example 500 implementation of this process. Given frames "V(i)" 502 and "V(j)" 504, if the appearance similarity was used solely within the original bounding boxes 506, a transition would be formed between two clips with different foreground motion, leading to a semantically wrong motion. Transforming the bounding boxes in the second clip according to the motion in the first 508 and using the equation below results in a low score in this case.

For example, the transformed bounding box is used to compute the motion similarity between the two frames as follows:

$$S_{motion}(i, j) = \sum_{-l \leq k \leq l} S'_{app}(i+k, j+k)$$

where "$S'_{app}$" is used to compute the appearance similarity as above but uses the transformed bounding box "B'(j)" for the second frame. In one or more implementations, a range of three frames is used to compute the motion similarity.

Optimizing a similarity function can be computationally expensive, since the optimization requires computing dense correspondences between each possible pair of frames. In order to increase computational efficiency, two approximations may be made. First, precision used to choose the transition point is desirable, as being one or two frames away from the optimal transition point can have a significant effect on a final result. Thus, it may seem important to explore each possible transition point. However, most potential transition points are actually bad candidates and the similarity behaves smoothly around the good ones. Accordingly, a coarse-to-fine strategy may be employed to find the transition points. A value of "$S_{app}$", for instance, may be evaluated periodically (e.g., at every fifth pair of frames), and a subset of these candidates is selected to explore at the finest temporal resolution.

Second, computing "$S_{motion}$" is computationally expensive because for each pair of frames the NRDC is computed an order of "$O(n^3)$" number of times. To avoid such a large amount of computations, a two-step process may be used. First, a subset (e.g., top 20) candidate pairs are computed using the "$S_{app}$" score, and then "$S_{motion}$" is computed. The full similarity metric is then evaluated on this subset. Finally, the search for transition points is constrained to frames that are at least a set number of frames apart (i.e., |i−j+1|≥20) to avoid short loops. In this way, hours of processing may be avoided and thus improve a user's experience in making the looping videos.

As shown in FIG. 2, the similarity measure is used to compute a transition 216 of similar frames 218 that identifies first and second frames 220, 220, that is then passed to a video synthesis module 224 to synthesize the looping video. For example, during synthesis the video synthesis module 224 takes the transition point "(a,b)(b>a, w.l.o.g.)" resulting from the optimization above and produces an output looping video 110 "$V_{out}$" that closes the loop seamlessly. This is performed by ensuring that the motion and appearance of the foreground regions 206 changes smoothly, and that there is a reasonably smooth transition of the background regions 208.

Preference in smoothing is weighted toward the foreground region 206 as previously described. This is based on the realization that a viewer's attention is focused on the foreground, and, therefore, a smoother foreground transition will lead to a more compelling transition, as long as the transition of the background is not too abrupt. In this following section, morphing techniques are described to morph one or more frames to increase similarity, one to another, to smooth this transition. This is performed using a foreground morphing module 226 that is configured to align the foreground regions 206 using a global, coarse, and rigid alignment of the frames of the video. Then, a background morphing module 228 is used to morph the background region 208 as described in the following.

Since the similarity measure above is based on correspondences, the similarity measure does not guarantee the alignment of the foregrounds in frames "V(a)" and "V(b)" that are to serve as the transition 2126. To do so, gross global differences in the alignment are handled by constructing a virtual camera path. A transformation "T̂" is computed that includes a translation and a scale that best aligns these frames. To ensure that the transition is smooth, this transformation is spread over a window of frames after "V(a)" and before "V(b)." For this, a cubic spline "f(t)" of length "L" and with zero first and second derivatives at the end points is fit for each of the three transformation parameters (e.g., 2-D translation and 1-D scale), these splines are sampled to compute interpolated transformations which are then applied to the frames.

Applying the transformations to the start and end of the subset of frames that are to be used to form the looping video 1200 results in two sets of frames around the transition point that are rigidly aligned. However, there may still be misalignments because of small changes in appearance or non-rigid motion in the scene. As a result, naive approaches like concatenation or cross-fading may create artifacts like abrupt cuts or ghosting, respectively. Traditional morphing (TM) techniques use a combination of optical flow and cross-fading to alleviate this problem. However, casual videos are often noisy and have large displacements (e.g., large amounts of motion) as described above which may lead to poor flow results that, as illustrated in the results section below, manifest in poor synthesis results.

Accordingly, a patch-based morphing technique may be used, e.g., Regenerative Morphing (RM), in which intermediate frames are synthesized using patches from two source frames while preserving local similarity to the sources and to consecutive frames for temporal coherence. Regenerative morphing demonstrates good performance on scenarios ranging from interpolating nearby views to morphing entirely different images and thus may be employed to smoothly morph the subset of frames around the transition 216.

Regenerative morphing may be used in a straightforward manner, i.e., given the transition point "(a,b)," interpolate between frames "V(a+k)" and "V(b−k)," where "2k" is the size of the window considered to be wide enough to create a smooth transition. This is a purely image-based approach that does not leverage availability of multiple frames "(V (a:a+k) and V(b−k:b))" near the transition that are in close alignment.

A useful property of regenerative morphing is an ability to incorporate correspondences between frames as constraints. When correspondences exist, pixels in one source can be constrained to move on a linear path towards corresponding locations in the second source. Regions without correspondence are reconstructed in a plausible way that satisfies the correspondence constraints. However regenerative morphing has been demonstrated on image interpolation of relatively nearby views, where linear motion of corresponding pixels is a plausible assumption. In a casual video scenario, however, the input may include a pair of image sequences with complex camera motions and non-rigid scene dynamics, e.g., for moving people. The linear motion assumption, therefore, may not hold in these cases and leads to unrealistic dynamics during the transition.

To address this challenge, regenerative motion is generalized to address parabolic motion for a pixel. The parabola is computed by using NRDC correspondences between 4 frames: "V(a)-to-V(b)," "V(a)-to-V(a+k)" and "V(b−k)-to-V(b)." A parabola is fit to these correspondences and samples are taken along it to generate the motion at each constrained pixel, in which the pixels are constrained using random sampling.

Figure 6:
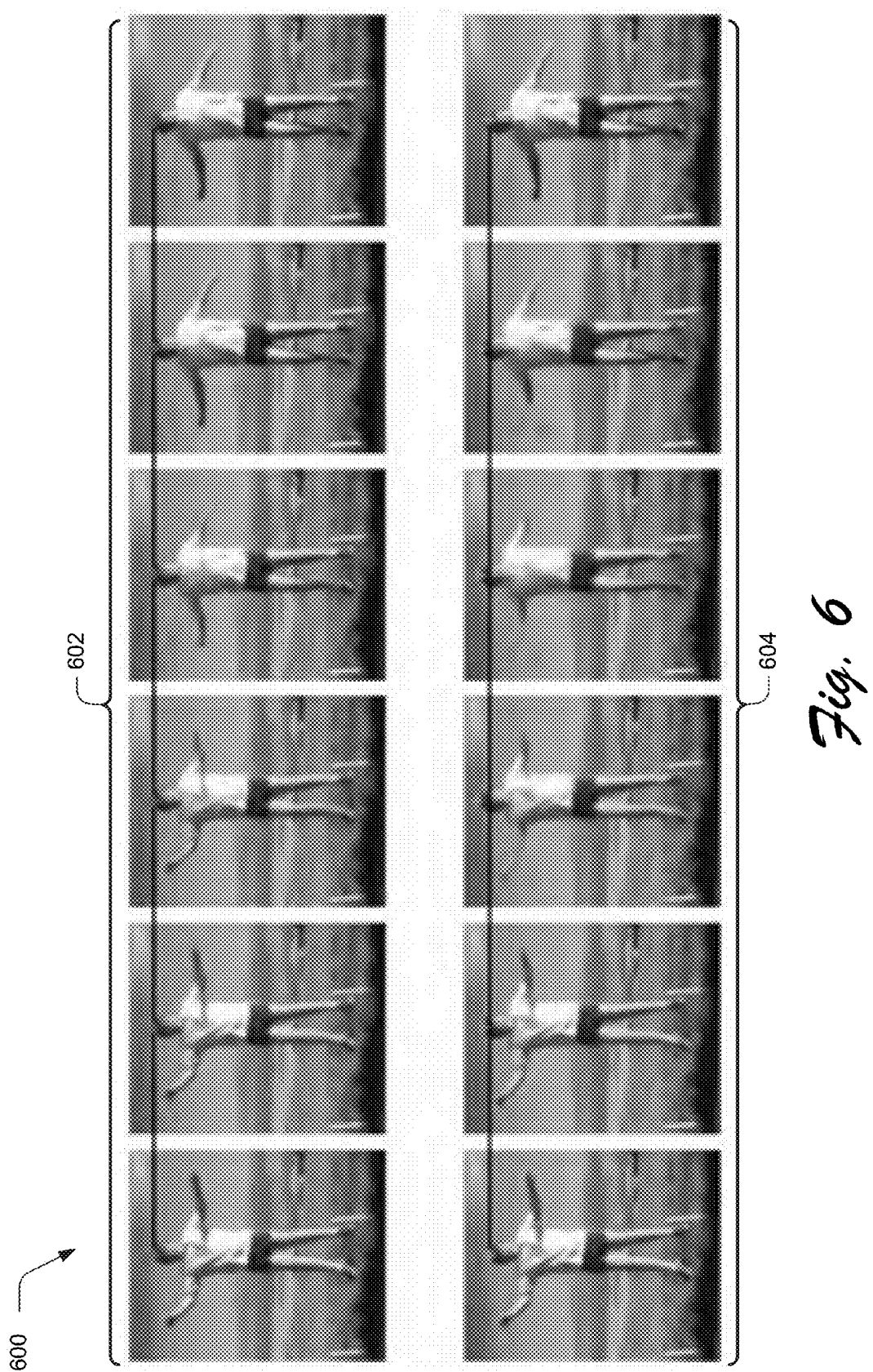
FIG. 6 depicts an example implementation in which a linear motion transition is contrasted with a parabolic motion transition.

FIG. 6 depicts an example implementation 600 in which a linear motion transition 602 is contrasted with a parabolic motion transition 604. The illustrated frames show a person jumping. The parabolic constraints capture the correct dynamics and lead to a natural motion during a part of the transition located at the peak of the jump, while the linear constraints make the person "freeze" unnaturally in the air during this part of the transition.

Morphing may be performed using a fixed temporal window size, i.e., the number of frames to be interpolated. In the example above, the foreground is well aligned due to the choice of the optimal transition point and the virtual camera path, and thus a small number of frames is enough to produce a smooth transition of the foreground region 206.

However, the background regions can include significant differences between frames "V(a)" and "V(b)." Regenerative morphing has been shown to perform well at morphing significantly different content when the transition window is sufficiently long. However, in some instances use of the same short temporal window for morphing of the background region 208 may cause this region to change abruptly, producing an undesired transition.

Accordingly, the video synthesis module 224 may be configured to morph the foreground region 206 by the foreground morphing module 226 in a first stage and then morph the background region 208 using the background morphing module 228 in a second stage with a different window size.

The size of the window for morphing the foreground region 206 in the example above is four frames, i.e., morph between frames "V(a+2)" and "V(b−2)." In instances, in which the foreground region 206 exhibits movement over a threshold amount there may be no correspondences between neighboring in the foreground. In this case, a concatenation of the foreground region 206 may be used to increase similarity of the frames. Since NRDC provides a confidence map for each correspondence, this may be used as a proxy to decide whether to use the previously described morphing techniques or concatenation technique to morph.

The size of the window for morphing the background region 208 is computed automatically for each video. The criterion to choose the starting and ending frames is that the velocity of the camera (both direction and magnitude) is to change as little as possible when introducing the morph. More specifically, pairs of frames "V(c)" and "V(d)" are explored around the transition point where "c<a,d>b." For each pair of possible frames, the camera motion at those frames in the original video is computed along with the camera motion that would be introduced by morphing, if performed.

The pair of frames are chosen where the induced motion is most similar to that in the original video. As in the case of the foreground region, it is possible that there are not enough correspondences to compute a camera motion between frames after "V(a)" and before "V(b)" and as such the morph may not look realistic. This scenario is more common than in the case of the foreground region 206, because "V(a)" and "V(b)" are not chosen to match the background region 208, and typically occurs because the camera is moving quickly. In this case, motion constraints are imposed on the background region 208, so that the background region 208 exhibits movement at the same velocity as before and after the transition. As in the case of the foreground region 206, an NRDC confidence map is used to decide whether to use motion or correspondences constraints.

Figure 7:
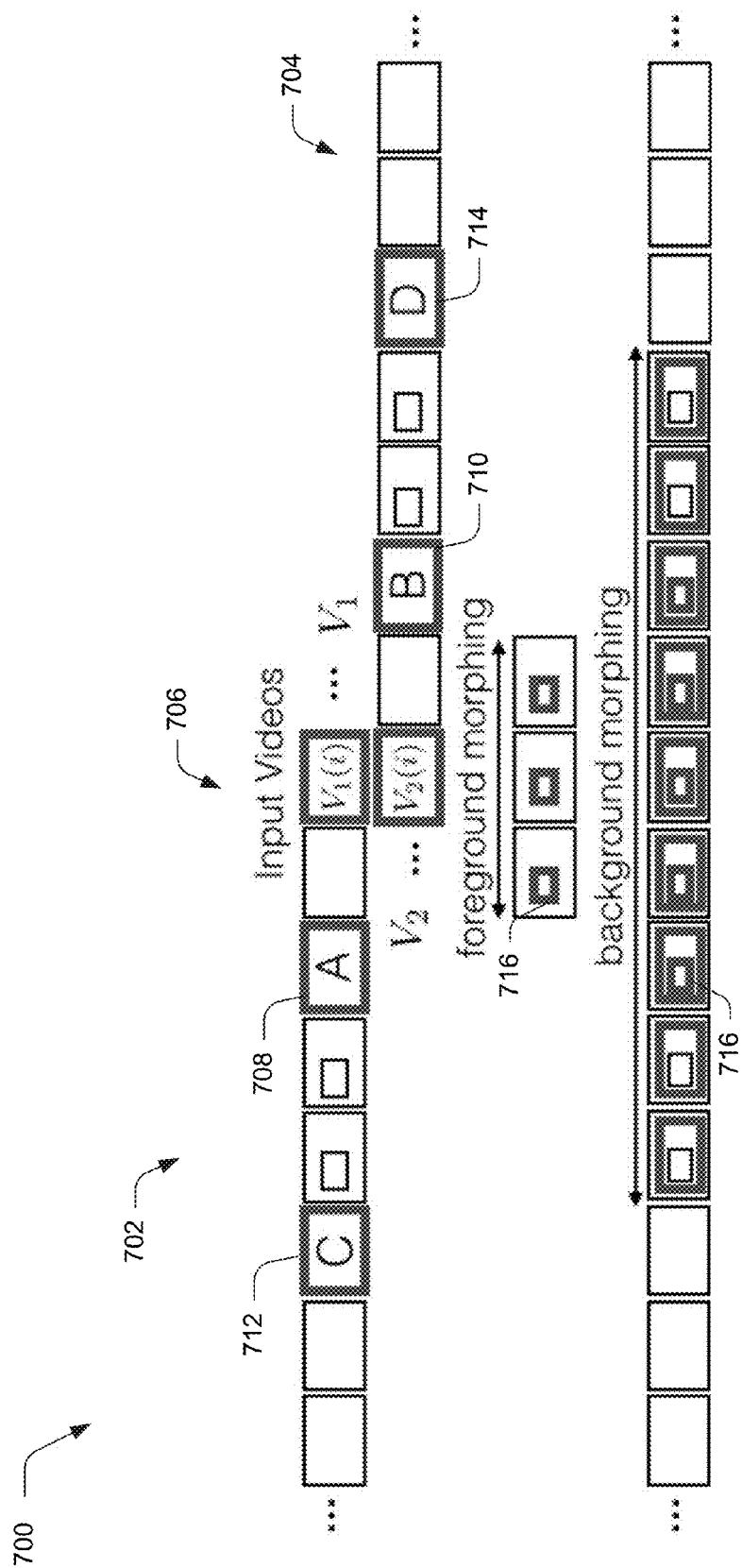
FIG. 7 depicts an example implementation of morphing integration of foreground and background regions.

FIG. 7 depicts an example implementation 700 of morphing integration of foreground and background regions. In this example, the same video sub-clip is depicted two separate clips that are aligned at a transition point 706 and thus the start of "V₁" 702 and the end of "V₂" 704 are the same. Frames A 708 and B 710 around the transition point 706 are selected to synthesize the foreground region with parabolic motion constraints. A longer window, which includes frames C 712 and D 714 are used to synthesize the background region using linear motion and employs the previously computed foreground region as a constraint. This is enforced by pasting in the foreground region 206 during the optimization, and is signified with the small inner boxes 716. For frames where the background region 208 is synthesized but not the foreground region 206, i.e.: frames between "C−A" and between "B−D," the foreground constraint uses the original segmented foreground from the video. The background region 208 is synthesized with linear constraints, based on correspondences, if enough are available, or by using motion based constraints otherwise. Once the foreground region 206 is morphed, it is pasted during the background morph at each synthesis iteration of the coarse-to-fine process used by RM. In this way, it ensures that the foreground is used as a constraint for the synthesis of the background.

FIG. 8 depicts an example comparison 800 of results of texture morphing 802, conventional morphing 804, and morphing 806 using the techniques described herein. As illustrated, the techniques described herein overcome residual misalignments and result in a clean morph while the other two techniques suffer from "ghosting" artifacts due to limitations of traditional optical flow and warping methods in this challenging case.

Figure 9:
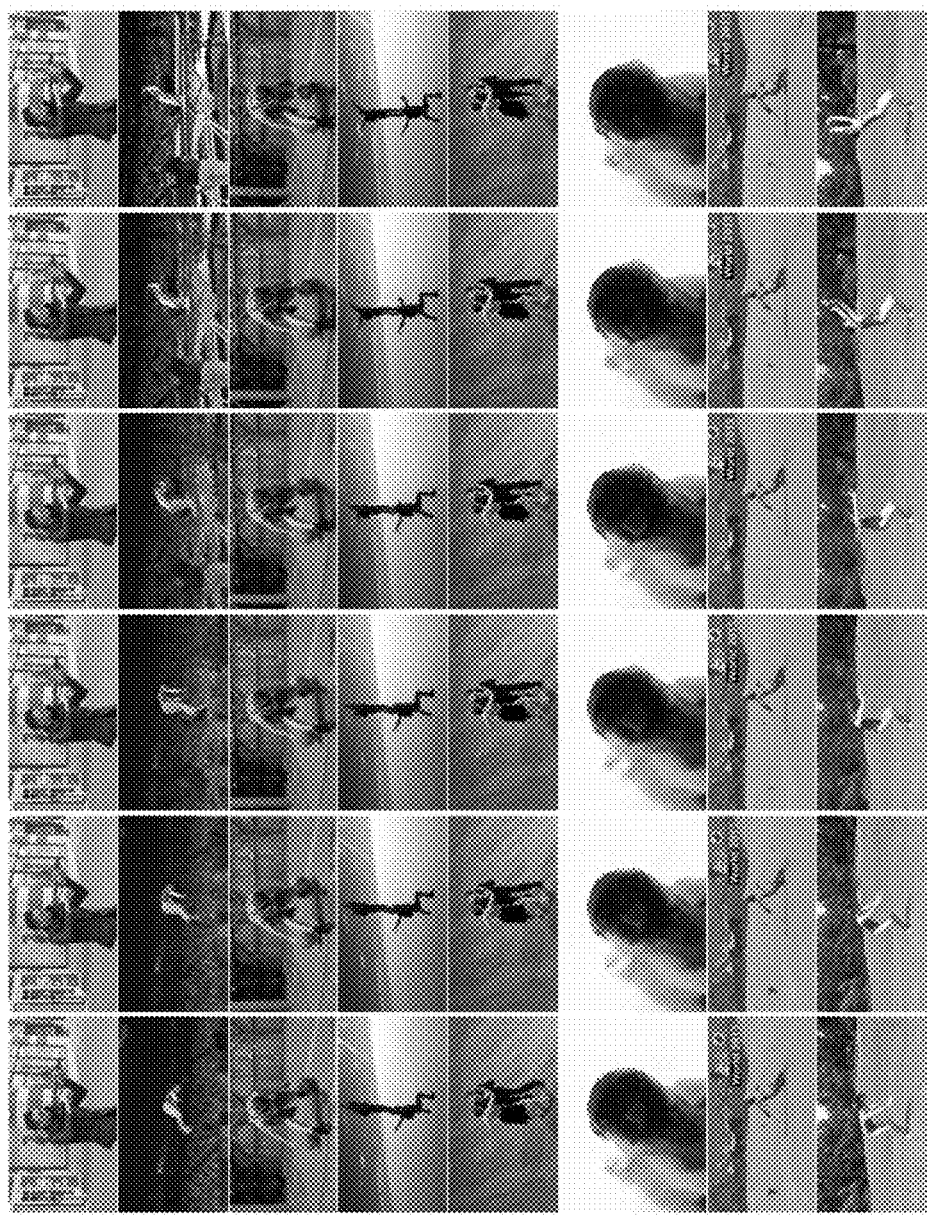
FIG. 9 depicts an implementation showing example results of transitions of the looping video techniques described herein.

FIG. 9 depicts an implementation 900 showing example results 902, 904, 906, 908, 910, 912, 914, 916 of transitions of the looping video techniques described herein. For the basketball results 906, this example contains large changes in scale, which illustrates the value of using the virtual camera path because morphing produces much better results when the foreground is aligned. This results 906 also contain motions that are not linear at all, such as the bouncing balls, which illustrates the usefulness of parabolic-described motions.

Trampoline results 904, show the importance of the foreground region-based similarity metric. Since the foreground region occupies a fairly small portion of the frame, a similarity metric that does not take into account separation between foreground and background regions would be dominated by the background. In addition, in this video morphing of the background region is particularly challenging because the scene moves quickly. In this case motion constraints are used to maintain the same motion during the morph.

The tango results 910 contains a slow detailed motion of the foreground region, where a linear morph would produce unlikely motions. Also, the floor as part of the background region moves slowly with respect to the camera. In a large window size for the background region addresses these differences and allows the camera motion to stay slow and smooth.

In the skydiving results 908 it is again shown desirability of use of a metric that separates between foreground and background regions, because otherwise the energy is dominated by the horizon in the background. During synthesis, traditional morphing fails because flow estimation is unreliable due to the low texture of the sequence.

For the violin results 902, the video contains an almost fixed camera perspective, with detailed and structured foreground motions. In this case, the parabolic motion produces a realistic result having better realism than traditional morphing.

In the dog results 912, the camera is fixed, but a foreground object moves from one side of the frame to the other. This video also illustrates the value of a virtual camera path, because in the case of traditional morphing, where the clips are not aligned, the foreground is morphed and displaced simultaneously, creating an unrealistic effect.

In the skiing results 914, the skier in the foreground region of this video moves from side to side, and the camera undergoes a significant amount of motion. The frame is dominated by the background. The techniques described herein are able to produce a visually pleasing loop of the skier using parabolic motion, while interpolating the mountains in the background using linear motion constraints.

For the back-flip results 916, a gymnast is depicted performing backflips in front of a background that changes significantly. The techniques described here produce a natural look of the gymnast's motion.

In the above, automated techniques are described for creating looping videos from casual videos. The techniques are capable of handling complex camera and foreground motions, and are demonstrated on a variety of unconstrained videos. The techniques may be generalized to stitch two input videos instead of one, if the two clips capture the same scene under a similar viewpoint. This could be used for many applications, like video editing, view interpolation, or video summarization, e.g., summaries from multiple videos of the same event. In addition, different components of the techniques described herein may be changed for specific applications. For example, the similarity metric may be modified to evaluate motion similarity solely, instead of motion and appearance. This allows for stitching together videos with similar dynamics but different appearances, such as different people doing the same dance or practicing the same sport.

Example Procedures

The following discussion describes automated looping video creation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

Figure 10:
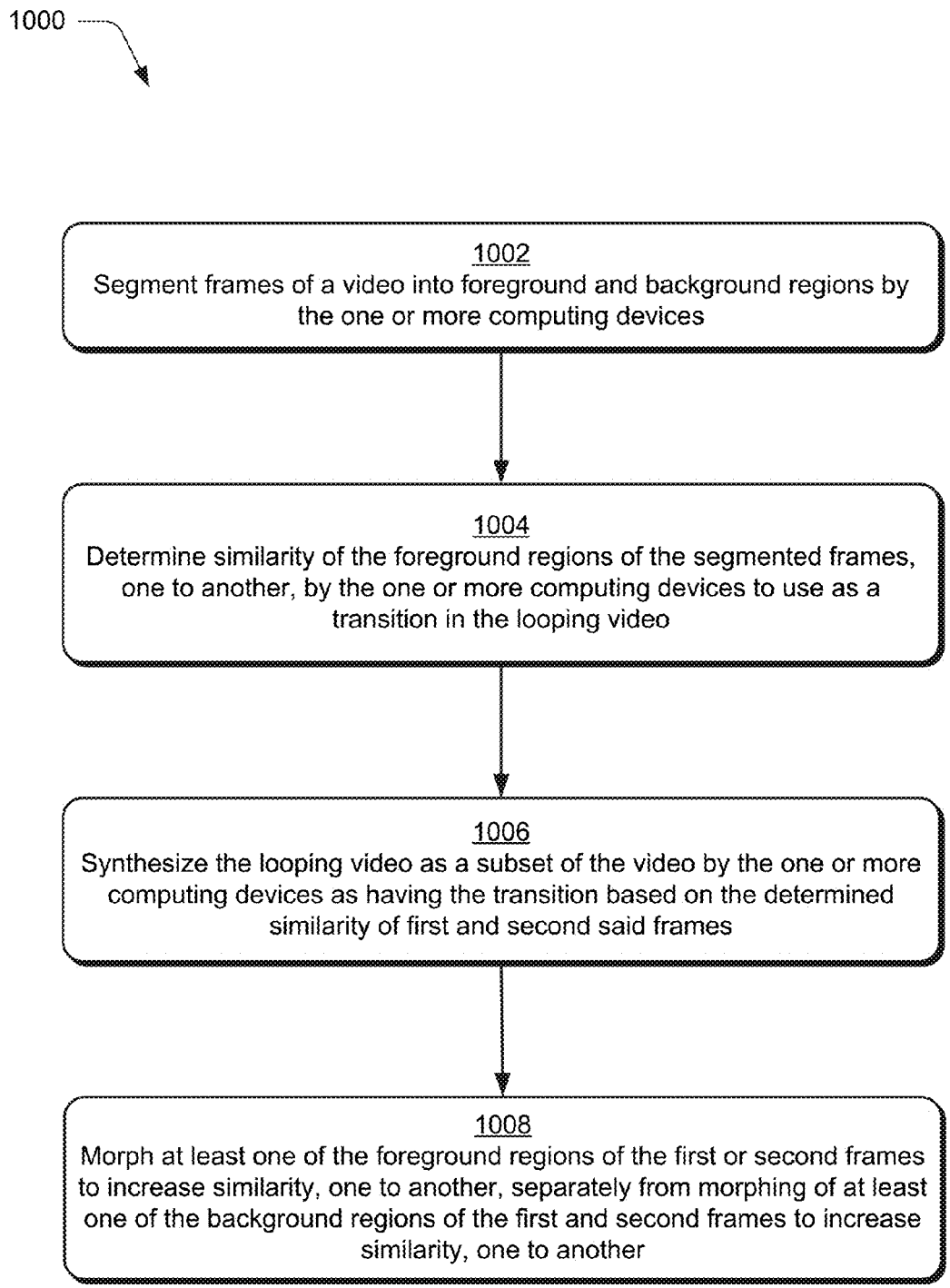
FIG. 10 is a flow diagram depicting a procedure in an example implementation in which a transition is located and morphing performed to create a looping video.

FIG. 10 depicts a procedure 1000 in an example implementation in which a transition is located and morphing performed to create a looping video. In this example, a digital medium environment is configured to create a looping video that supports repeated playback that appears generally seamless to a user by one or more computing devices. First, frames of a video are segmented into foreground and background regions by the one or more computing devices (block 1002). A segmentation module 204, for instance, segments frames 108 of video 106 into foreground regions and background regions, respectively, based on motion, object identification, and so on.

Similarity of the foreground regions is determined of the segmented frames, one to another, by the one or more computing devices to use as a transition in the looping video (block 1004). A similarity module 210, for instance, then employs an appearance similarity module 212 to determine similarity of the foreground regions 206, one to another, as well as similarity of motion using a motion similarity module 214.

The looping video is synthesized as a subset of the video by the one or more computing devices as having the transition based on the determined similarity of first and second frames (block 1006). The video synthesis module 224 may then take a transition 216 identified based on the similarity as a basis to select a subset of the frames to form the looping video 110. As part of this synthesis, morphing is performed of at least one of the foreground regions of the first or second said frames to increase similarity, one to another, separately from morphing of at least one of the background regions of the first and second said frames to increase similarity, one to another (block 1008). As previously described, different morphing techniques may be employed for the foreground and background regions 206, 208. Also, techniques may be used to select which morphing technique to perform, such as to concatenate or use other morphing techniques described herein.

Example System and Device

Figure 11:
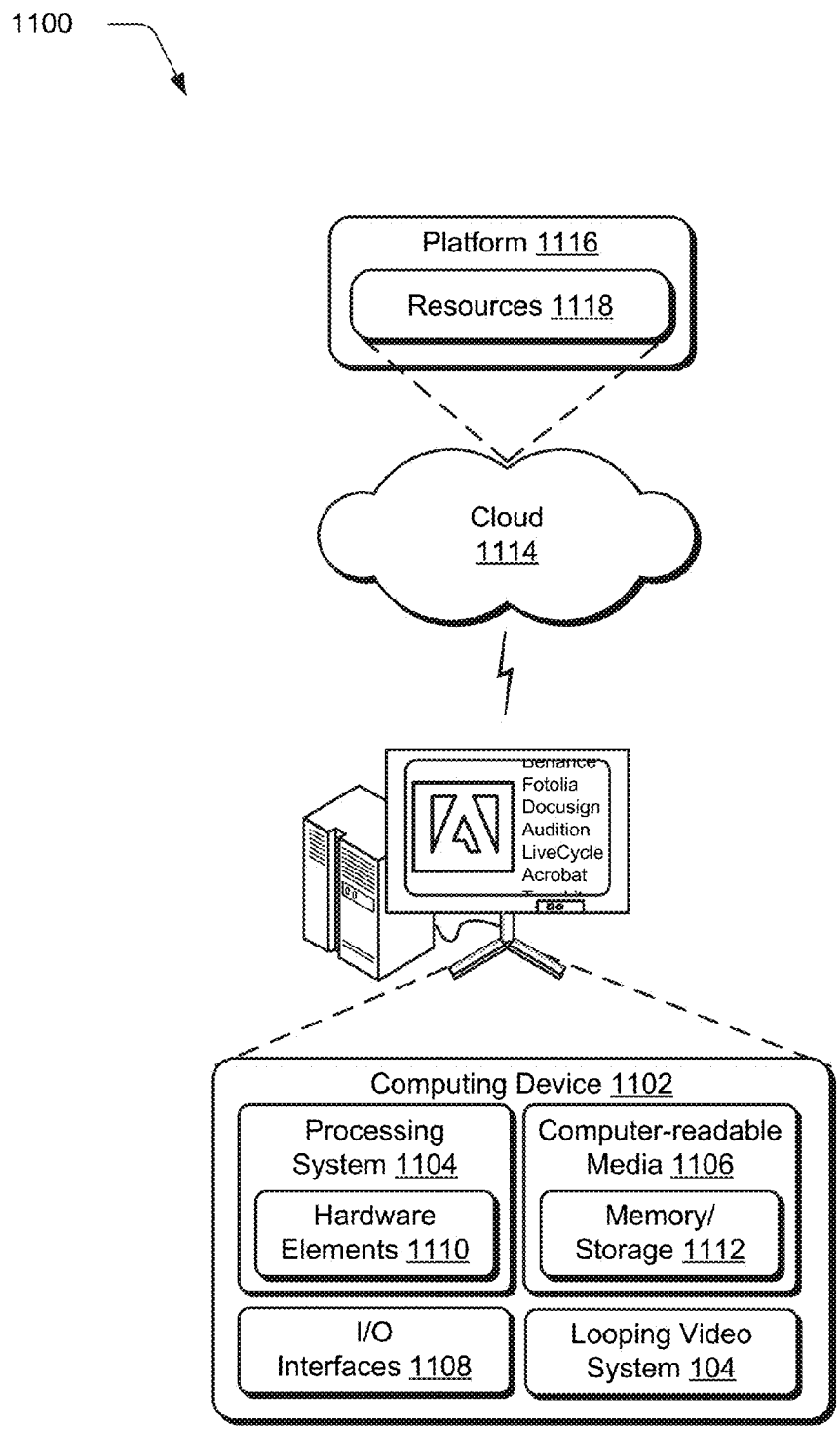
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the looping video system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method of creating a looping video configured to support repeated playback that appears generally seamless to a user by one or more computing devices, the method comprising:
   segmenting frames of a video into foreground and background regions by the one or more computing devices;
   determining similarity of the foreground regions of the segmented frames, one to another, by the one or more computing devices to use as a transition in the looping video; and
   synthesizing the looping video as a subset of the video by the one or more computing devices as having the transition based on the determined similarity of first and second said frames, the synthesizing including morphing at least one of the foreground regions of the first or second said frames separately from morphing of at least one of the background regions of the first and second said frames.

2. A method as described in claim 1, wherein the similarity is based on both appearance of the foreground regions and motion exhibited by the foreground regions.

3. A method as described in claim 2, wherein the similarity of the motion is determined through comparison of bounding boxes of respective said foreground regions of respective said frames.

4. A method as described in claim 2, wherein the similarity in the motion is computed by transforming bounding boxes by an estimate of rigid motion.

5. A method as described in claim 2, wherein the similarity of the appearance is determined through a Non-Rigid Dense Correspondence (NRDC) technique.

6. A method as described in claim 1, wherein the morphing at least one of the foreground regions of the first or second said frames increases similarity of the first and second said frames, one to another.

7. A method as described in claim 6, wherein the morphing is performed using a patch-based technique.

8. A method as described in claim 6, wherein the morphing at least one of the background regions of the first or second said frames increases similarity of the first and second said frames, one to another.

9. A method as described in claim 8, wherein the morphing of the at least one of the foreground regions is performed using a morphing technique that is different from a morphing techniques that is used to morph the at least one of the background regions.

10. A method as described in claim 8, wherein the morphing of the at least one of the foreground regions is performed using second-order parabolic motion constraints.

11. A method as described in claim 1, wherein the synthesizing includes use of an automatic temporal gap estimation technique to compute the morphing window for the background that is based on camera motion.

12. A method as described in claim 1, further comprising applying a warp stabilization technique to the video and wherein the segmenting is performed using the applied video.

13. A method as described in claim 1, wherein the segmenting is performed using a motion segmentation technique that involves an initial estimate based on motion boundaries followed by refinement based on spatial and temporal considerations.

14. In a digital medium environment configured to create a looping video that supports repeated playback that appears generally seamless to a user, a system comprising:
a similarity module implemented at least partially in hardware and configured to determine similarity of foreground regions of frames of a video, one to another, automatically and without user intervention to use as a transition in the looping video, the similarity based on appearance of the foreground regions and motion exhibited by the foreground regions; and
a video synthesis module implemented at least partially in hardware and configured to synthesize the looping video having the transition based on the determined similarity of first and second said frames, the synthesizing including morphing at least one of the foreground regions of the first or second said frames to increase similarity, one to another, separately from morphing of at least one of the background regions of the first and second said frames to increase similarity, one to another.

15. A system as described in claim 14, wherein the similarity of the motion is determined through comparison of bounding boxes of respective said foreground regions of respective said frames.

16. A system as described in claim 14, wherein the similarity of the motion is computed by transforming bounding boxes by an estimate of rigid motion.

17. In a digital medium environment, a method of creating a looping video configured to support repeated playback that appears generally seamless to a user, the method comprising:
segmenting frames of a video into foreground and background regions by one or more computing devices;
determining similarity of the foreground regions of the segmented frames, one to another, by the one or more computing devices to use as a transition in the looping video; and
synthesizing the looping video by the one or more computing devices having the transition based on the determined similarity of first and second said frames, the synthesizing including morphing at least one of the foreground regions of the first or second said frames to increase similarity, one to another, separately from morphing of at least one of the background regions of the first and second said frames to increase similarity, one to another.

18. A method as described in claim 17, wherein the similarity is based on both appearance of the foreground regions and motion exhibited by the foreground regions.

19. A method as described in claim 17, wherein a morphing technique used to perform the morphing of the at least one of the foreground regions is different than a morphing technique that is used to morph the at least one of the background regions is performed using linear motion constraints.

20. A method as described in claim 17, wherein the morphing of the at least one of the foreground regions is performed using second-order constraints and the morphing of the at least one of the background regions is performed using linear motion constraints.

* * * * *